United States Patent [19]

Antonini et al.

[11] Patent Number: 4,640,629

[45] Date of Patent: Feb. 3, 1987

[54] THERMISTOR-BOLOMETER AND METHOD FOR THE MANUFACTURE THEREOF

[75] Inventors: Bruno Antonini; Camillo Borghese; Arnaldo D'Amico; Paolo DeGasperis; Antonio Paoletti; Paolo Paroli; Giovanni Petrocco; Aldo Tucciarone; Fernando Scarinci, all of Rome, Italy

[73] Assignee: Consiglio Nazionale Delle Ricerche, Rome, Italy

[21] Appl. No.: 513,199

[22] Filed: Jul. 12, 1983

[30] Foreign Application Priority Data

Jul. 12, 1982 [IT] Italy ............................... 48797 A/82

[51] Int. Cl.[4] ............................................. G01K 7/16
[52] U.S. Cl. .................................... 374/178; 374/185; 374/121; 29/573; 338/22 SD
[58] Field of Search ................... 374/178, 179, 32, 15, 374/112, 121; 250/338, 370; 29/576 E, 573; 338/15, 18, 22 SD

[56] References Cited

U.S. PATENT DOCUMENTS

| | | | |
|---|---|---|---|
| 2,986,034 | 5/1961 | Jones | 374/121 |
| 3,012,212 | 12/1961 | Hicks | 374/121 |
| 3,443,103 | 5/1969 | Lakshamannan | 338/15 |
| 3,693,011 | 9/1972 | De Vaux et al. | 374/121 |
| 3,961,998 | 6/1976 | Scharnhorst et al. | 338/15 |
| 3,985,685 | 12/1976 | Houlton et al. | 250/370 |
| 4,001,586 | 1/1977 | Fraioll | 374/121 |
| 4,018,692 | 4/1977 | Akselrad et al. | 369/33 |
| 4,020,475 | 4/1977 | Lotgering et al. | 369/122 |
| 4,061,917 | 12/1977 | Goranson et al. | 250/338 |
| 4,152,676 | 5/1979 | Morgenthalen et al. | 333/161 |
| 4,312,114 | 1/1982 | Schoolar | 29/576 E |

Primary Examiner—Charles Frankfort
Assistant Examiner—Thomas B. Will
Attorney, Agent, or Firm—Pollock, Vande Sande & Priddy

[57] ABSTRACT

Subject-matter of this invention is a thermistor-bolometer comprising as a detector body a structure consisting of a low resistivity layer of a doped magnetic garnet, two contact elements of conductive material adapted to form ohmic contacts and two conductive wires connected with the contact elements by contact pads, in order to connect the detector body with the biasing circuit and with the read-out circuit.

10 Claims, 6 Drawing Figures

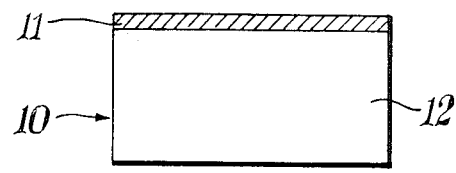
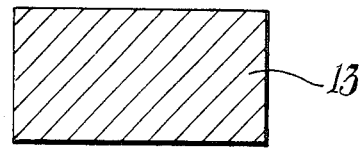
Fig. 1a        Fig. 1b
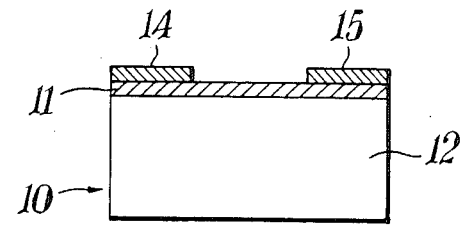
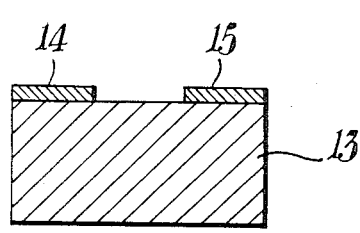
Fig. 2a        Fig. 2b
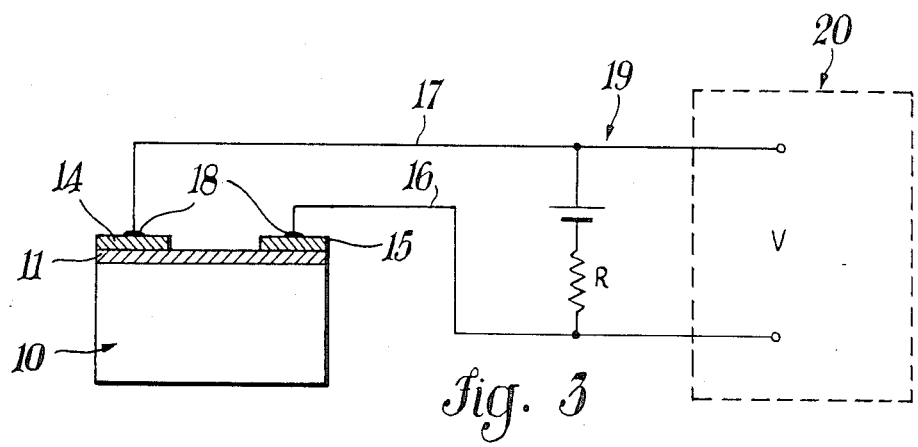
Fig. 3
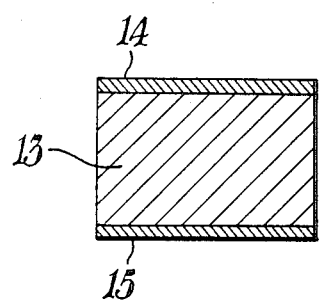
Fig. 4

THERMISTOR-BOLOMETER AND METHOD FOR THE MANUFACTURE THEREOF

This invention relates to a thermistor-bolometer and more particularly it concerns a novel physical structure for a thermistor-bolometer.

As it is known, such devices are intended to measure the energy intensity of electromagnetic radiations, and in this mode of operation they operate as conventional bolometers, or they are intended to measure the temperature of a body by relying upon the heat transmitted therefrom by contact or by contact-convection, rather than by relying upon the radiated heat, and in this mode of operation they operate as conventional thermistors. These two operation or utilization modes, however, do not entail substantial differences, on the contrary they only require slight structure adaptations, uniquely bound to the different ways by which the thermal energy is applied to the body of the concerned device.

STATE OF THE ART

In the state of the art, some thermistor-bolometers are already known, made with bodies of semiconductor materials, or of amorphous paste or even of metal (for inst. platinum with temperature coefficient of 0.31). All the devices of the state of the art, however, have some operation or cost disadvantages and this invention is aimed at eliminating such deficiencies.

The main object of this invention, therefore, is to provide a thermistor-bolometer having great quickness, high response capability (responsivity) and high thermal coefficient of resistivity, in order to operate with high sensitivity.

SUMMARY OF THE INVENTION

The thermistor-bolometer according to this invention, comprises a detector body consisting of a low resistivity layer of a doped magnetic garnet, two contact elements of conductive material adapted to form ohmic contacts and two conductive wires, connected with said contact elements, in order to connect the detector body with the biasing circuit and with the read-out circuit.

In a first embodiment of the invention, the layer of doped magnetic garnet is made of a film applied upon a substrate, for instance of $Gd_3Ga_5O_{12}$.

In a further embodiment, the layer of doped magnetic garnet is formed as a parallelpiped shaped block (bulk embodiment) upon which the above mentioned contact elements and conductive wires are applied.

The substantial advantages of a structure made as above outlined, in addition to the already set forth high response capability, are as follows:

the structure has a low manufacturing cost, particularly in its thin film embodiment, the detector body is intrinsically black and in view of this there is no need to coat it with any radiation absorbing layers;

the used material is washable and mechanically sound, so that it can be used without difficulties in a temperature range of $-180°$ to $+900°$ C.

Further details and features of this invention will be apparent from the following description, reference being made to the annexed drawings in which the preferred embodiments of the invention are shown by way of illustration and not as a limitation.

In the drawings:

FIG. 1a shows the detector body of the thermistor-bolometer of this invention in its embodiment comprising a thin film upon a substrate;

FIG. 1b shows the detector body in its embodiment as a block (bulk embodiment);

FIG. 2a shows the detector body of FIG. 1a, with contact elements in place, and

FIG. 2b shows the contact elements applied to the block of FIG. 1b;

FIG. 3 shows the detector body of FIGS. 1a and 2a with contact elements and conductor wires in place, as connected to a biasing circuit and to a read-out circuit; and FIG. 4 shows the block detector body (bulk embodiment) with two contact elements in place upon the opposed faces of the block.

In a preferred embodiment, the thermistor-bolometer comprises a detector body 10 consisting of a thin plate or film 11 of doped magnetic garnet YIG (Yttrium Iron Garnet) formed by epitaxial growth upon a substrate 12 of $Gd_3Ga_5O_{12}$. This structure is shown in FIG. 1a.

The detector body can also be formed by a small block (bulk embodiment) 13 of doped magnetic garnet YIG, as shown in FIG. 1b, formed in crucible.

In any case, the substantial material by which the detector body of the thermistor-bolometer of this invention is made is characterized by a negative temperature coefficient ($\alpha = (1/R)(dR/dT)$) and it can have a n-type or a p-type conductivity, depending on the dopant agent that is used with the concerned material.

Two contact elements 14,15 of conductive material, adapted to form ohmic contacts, are provided upon the surface of the thin film 11 or upon one of the faces of block 13 of doped magnetic garnet. A chromium-gold alloy or only gold is usually used. The method for deposition of such contact elements preferably is chosen among the known radio sputtering or spraying methods or among other alternative methods, such as evaporation. The application of said contact elements upon the thin film structure or upon the block structure respectively, is shown in FIGS. 2a and 2b.

Two conductor wires 16 and 17 are then affixed to the contact elements 14 and 15 by means of two contact pads 18 made by thermo-compression or by means of ultrasonic methods or by conductive resins. Conductor wires 16, 17 are intended to connect the detector body to the biasing circuit 19 and to the read-out circuit 20, which is implemented as a high impedence voltage measuring circuit. The assembly is shown in FIG. 3.

When the concerned device is used as a bolometer, the structure has a free gap of any shape between the two contact elements 14 and 15 in order to allow the incident radiation to be easily absorbed. When the device is used as a thermistor, the concerned structure normally is engaged in thermal-contact with the source the temperature of which is to be measured; whereby in a device int ended for operation as a thermistor, the free gap between the two-contact elements may also be restricted.

In particular, in a device designed for operating as a thermistor and having a block shaped structure, the two contact elements can also be placed upon the opposed faces of the block, as shown in FIG. 4.

The materials that can be used to make the thermistor-bolometer are generally all magnetic garnets adapted to be doped. By way of examples, some types are hereinbelow quoted in illustrative but not limitative sense:

silicon doped YIG
germanium doped YIG
titanium doped YIG
niobium doped YIG
tin doped YIG
calcium doped YIG ($\alpha=4.8\%/°C$.)

The most important features evidenced in a thermistor-bolometer according to the invention are a high activation energy, a low thermal capacity and a low resistivity.

It should also be mentioned that the temperature coefficient so achieved has a very high value in the range of $-2$ to $-8$ and that the contact elements and the conductor wires are connected with the detector body in such a manner as to make low noise ohmic contacts. In particular, the achievement of such low noise ohmic contacts requires a thermal annealing treatment including a heating step from room temperature to about 380° C. and a subsequent cooling step back to room temperature with a roll-off time (cooling rate) of about $-5°$ C./min.

The preferred embodiments of this invention have been hereinbefore disclosed; it should be understood, however, that variations and changes can be made therein by those skilled in the art, without departing from the scope of this invention.

What is claimed is:

1. A thermistor-bolometer comprising a detector body (10) consisting of a low resistivity layer (11, 13) of a doped magnetic garnet, two contact elements (14, 15) of conductive material fastened on said low resistivity layer, said two contact elements being adapted to form ohmic contacts, and two conductor wires (16, 17) attached to said contact elements (14, 15) by means of contact pads (18) in order to connect said detector body to a biasing circuit and to a read-out circuit.

2. A thermistor-bolometer according to claim 1, characterized in that the layer (11) of doped magnetic garnet is formed as a thin film epitaxially grown upon a substrate.

3. A thermistor bolometer according to claim 1, characterized in that the layer (13) of doped magnetic garnet is formed as a block (bulk embodiment) in a crucible.

4. A thermistor-bolometer according to claim 1, characterized in that said contact elements are placed upon a surface of said doped magnetic garnet layer.

5. A thermistor-bolometer according to claim 3, characterized in that said contact elements are placed upon the opposed faces of said doped magnetic garnet block.

6. A method for manufacturing a thermistor-bolometer, comprising the following steps:
providing a low resistivity layer of doped magnetic garnet;
affixing two contact elements of a material adapted to form ohmic contacts to said layer of doped magnetic garnet;
applying two conductor wires to said contact elements by means of contact pads.

7. A method according to claim 6, characterized in that said layer of doped magnetic garnet is made as a thin film by epitaxial growth upon a substrate.

8. A method according to claim 6, characterized in that said layer of doped magnetic garnet is made as a small block (bulk embodiment) in a crucible.

9. A method according to claim 6, characterized in that said contact elements are made by radio-frequency spraying (sputtering) or by evaporation.

10. A method according to claim 6, characterized in that said contact pads are made by thermo-compression or by ultra sounds or are conductive resins.

* * * * *